US011279295B2

(12) United States Patent
Gauci

(10) Patent No.: US 11,279,295 B2
(45) Date of Patent: Mar. 22, 2022

(54) UNIVERSAL MOUNTING ROOF RACK ASSEMBLY

(71) Applicant: Lund Motion Products, Inc., Buford, GA (US)

(72) Inventor: Jason Gauci, Cumming, GA (US)

(73) Assignee: Lund Motion Products, Inc., Buford, GA (US)

( * ) Notice: Subject to any disclaimer, the term of this patent is extended or adjusted under 35 U.S.C. 154(b) by 0 days.

(21) Appl. No.: 16/434,755

(22) Filed: Jun. 7, 2019

(65) Prior Publication Data

US 2019/0375337 A1 Dec. 12, 2019

Related U.S. Application Data

(60) Provisional application No. 62/750,739, filed on Oct. 25, 2018, provisional application No. 62/682,657, filed on Jun. 8, 2018.

(51) Int. Cl.
*B60R 9/058* (2006.01)
(52) U.S. Cl.
CPC .................................. *B60R 9/058* (2013.01)
(58) Field of Classification Search
CPC .................................................... B60R 9/058
USPC ........................................................ 224/329
See application file for complete search history.

(56) References Cited

U.S. PATENT DOCUMENTS

| 2,782,972 | A | | 2/1957 | Binding |
| 3,064,868 | A | * | 11/1962 | Treydte ................... B60R 9/058 224/330 |
| 3,142,104 | A | | 7/1964 | Nielsen, Jr. |
| 3,385,488 | A | | 5/1968 | Bronson |
| 3,920,167 | A | * | 11/1975 | Parsons ................... B60R 9/058 224/331 |
| 4,166,560 | A | | 9/1979 | Werner et al. |
| 4,728,019 | A | | 3/1988 | Olliges |
| 6,491,192 | B2 | * | 12/2002 | Aki ......................... B60R 9/045 224/309 |
| 2006/0131934 | A1 | * | 6/2006 | Uchida .................... B60R 9/058 296/210 |

FOREIGN PATENT DOCUMENTS

| DE | 1 455 831 | 8/1964 |
| DE | 3 445 021 | 12/1984 |
| EP | 0 736 417 | 4/1996 |

* cited by examiner

*Primary Examiner* — Peter N Helvey
(74) *Attorney, Agent, or Firm* — Knobbe, Martens, Olson & Bear LLP

(57) ABSTRACT

Disclosed herein are embodiments of a roof rack assembly for use with a vehicle and related methods. The roof rack assembly can include a plurality of attachment assemblies with gutter inserts configured to extend within rain gutters of a vehicle. The attachment assemblies can also include clamps that are configured to at least partially wrap around a frame of the vehicle. The roof rack assembly can be attached to a vehicle without drilling and can be adjustable such that it is compatible with various vehicles.

22 Claims, 9 Drawing Sheets

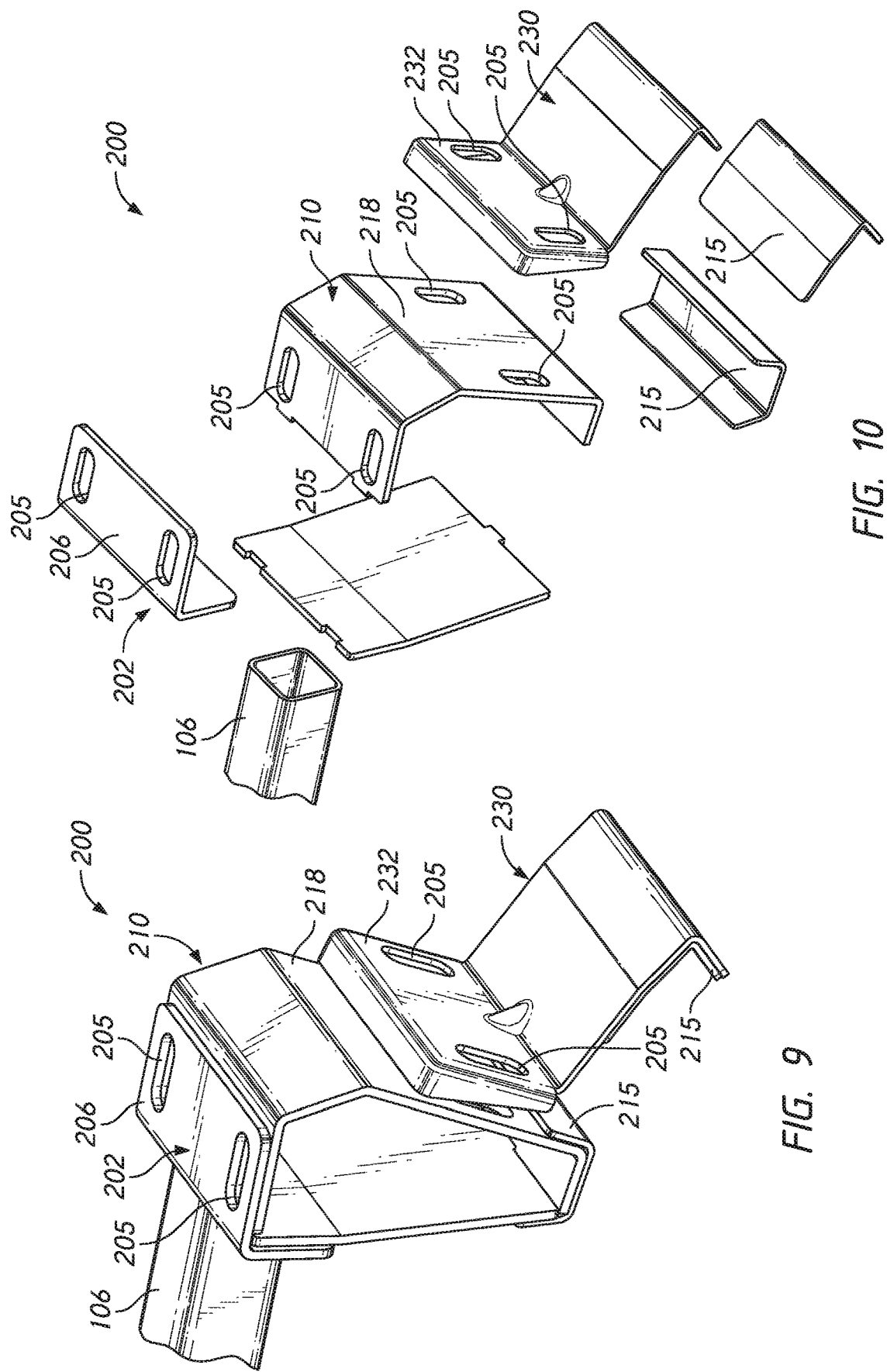

UNIVERSAL MOUNTING ROOF RACK ASSEMBLY

BACKGROUND

Field

The present disclosure is generally related to roof rack assemblies and related methods.

Description of the Related Art

Roof rack assemblies are configured for mounting racks to vehicles.

SUMMARY

Disclosed herein are embodiments of a universal roof rack assembly for a vehicle, the universal roof rack assembly comprising a roof rack body, a plurality of attachment assemblies, each of the plurality of attachment assemblies attached to the roof rack body or a brace supporting the roof rack body, each of the plurality of attachment assemblies comprising a gutter insert configured to extend within a rain gutter or rain duct of a vehicle, the gutter insert having a first portion defining a first surface configured to face inboards of the vehicle and a second portion separate from the first portion and defining a second surface configured to face outboards of the vehicle, wherein the first surface and the second surface form an acute angle, and a clamp attached to the gutter insert, the clamp configured to at least partially extend into and at least partially wrap around a frame of the vehicle, wherein the universal roof rack assembly is configured to attach to the vehicle without drilling.

In some embodiments, the frame of the vehicle is a door frame. In some embodiments, the attachment assembly can extend in an opposite direction from a pair of laterally extending bars from the roof rack body. In some embodiments, dimensions of the gutter insert can be modified by a user. In some embodiments, the gutter insert can be positioned between the roof rack body and the clamp. In some embodiments, the first surface and the second surface can form an angle between 10-45°. In some embodiments, the gutter insert can further comprise a third portion spacing the first portion from the second portion.

In some embodiments, the clamp can be adjustably connected to the gutter insert. In some embodiments, each of the clamp and the gutter insert can define a track configured to receive a fastener. The track of the clamp can be configured to align with the track of the gutter insert such that a relative position of the clamp and the gutter insert is adjustable. In some embodiments, the roof rack assembly defines a height and a width. In some embodiments, at least one of the height and the width of the roof rack assembly are adjustable. In some embodiments, both the height and the width of the roof rack assembly are adjustable.

In some embodiments, each of the plurality of attachment assemblies can include a cushion connected to a portion of the attachment assembly that is configured to contact the vehicle.

Also disclosed herein are embodiments of a vehicle having a universal roof rack assembly as disclosed herein.

Further disclosed herein are embodiments of a vehicle comprising a roof having a rain gutter defined by a first section defining a first surface, a second section defining a second surface generally opposite the first surface, and a third section connecting the first surface and the second surface, and a universal roof rack assembly for a vehicle, the universal roof rack assembly comprising a roof rack body, a plurality of attachment assemblies, each of the plurality of attachment assemblies attached to the roof rack body or a brace supporting the roof rack body, each of the plurality of attachment assemblies comprising a gutter insert configured to face within the rain gutter, the gutter insert having a first portion defining a first surface configured to extend inboards of the vehicle and a second portion separate from the first portion and defining a second surface configured to face outboards of the vehicle, wherein the first surface and the second surface form an acute angle, and a clamp attached to the gutter insert, the clamp configured to at least partially extend into and at least partially wrap around a frame of the vehicle, wherein the universal roof rack assembly is configured to attach to the vehicle without drilling, and wherein the first surface of the gutter insert is configured to contact the first surface of the rain gutter and the second surface of the gutter insert is configured to contact the second surface of the rain gutter, wherein the gutter insert is received into and mates with the rain gutter.

In some embodiments, the frame of the vehicle is a door frame. In some embodiments, dimensions of the gutter insert can be modified by a user. In some embodiments, the first surface and the second surface of the gutter insert can form an angle between 10-45°. The gutter insert can include a third portion spacing the first portion from the second portion.

In some embodiments, the clamp can be adjustably connected to the gutter insert. Each of the clamp and the gutter insert can define a track configured to receive a fastener. The track of the clamp can be configured to align with the track of the gutter insert such that a relative position of the clamp and the gutter insert is adjustable.

In some embodiments, each of the plurality of attachment assemblies can include a cushion connected to a portion of the attachment assembly that contacts the vehicle.

BRIEF DESCRIPTION OF THE DRAWINGS

FIGS. 9 and 10 illustrate detailed and exploded views of the attachment assembly of FIG. 8B without fasteners.

DETAILED DESCRIPTION

Disclosed herein are embodiments of a roof rack assembly, in particular a universal mounting roof rack, and methods of attachment. Advantageously, embodiments of the disclosure can be attached to a number of different vehicles having different shapes and sizes, without damaging the vehicle such as by drilling or screwing into a surface of the vehicle. Thus, the universal mounting roof rack assembly can have a no-drill installation. The roof rack assembly can be attached and detached without any permanent effect/damage to the vehicle. The roof rack assembly can be attached to, for example, cars, vans trucks, Jeeps, sports utility vehicles, etc.

Embodiments of the disclosure allow for the roof rack assembly to be installed at different locations on the roof of a vehicle. Further, the roof rack assembly can adjusted in position along the roof of the vehicle as needed. Additionally, the roof rack assembly can put weight on the gutters, and not directly on the roof, which can advantageously spread around the weight. Rain gutters are typically more reinforced than the roof itself. In some embodiments, the roof rack may weigh 350 lbs. or more.

Figure 1:
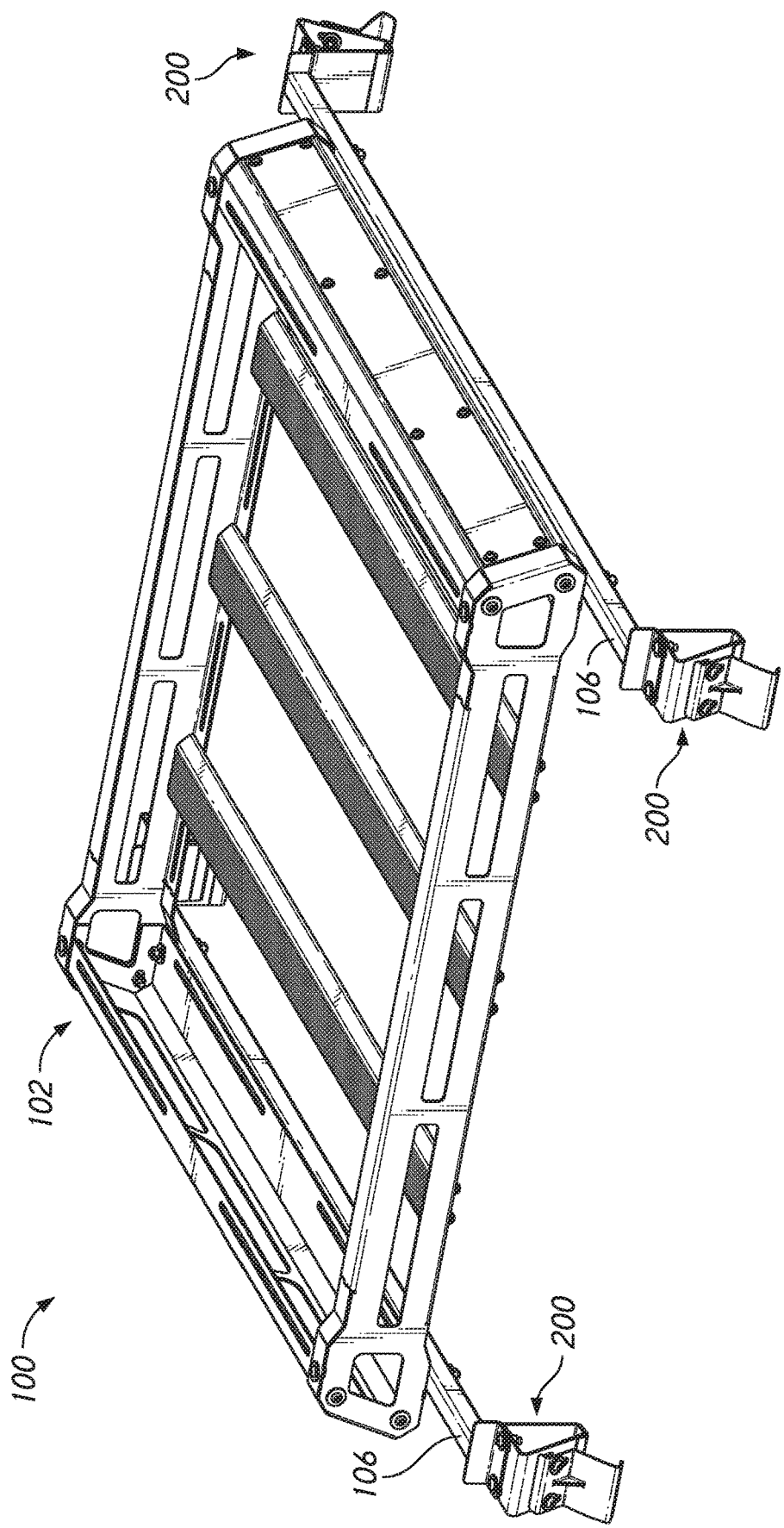
FIGS. 1 and 2 illustrate embodiments of a universal mounting roof rack assembly.
Figure 2:
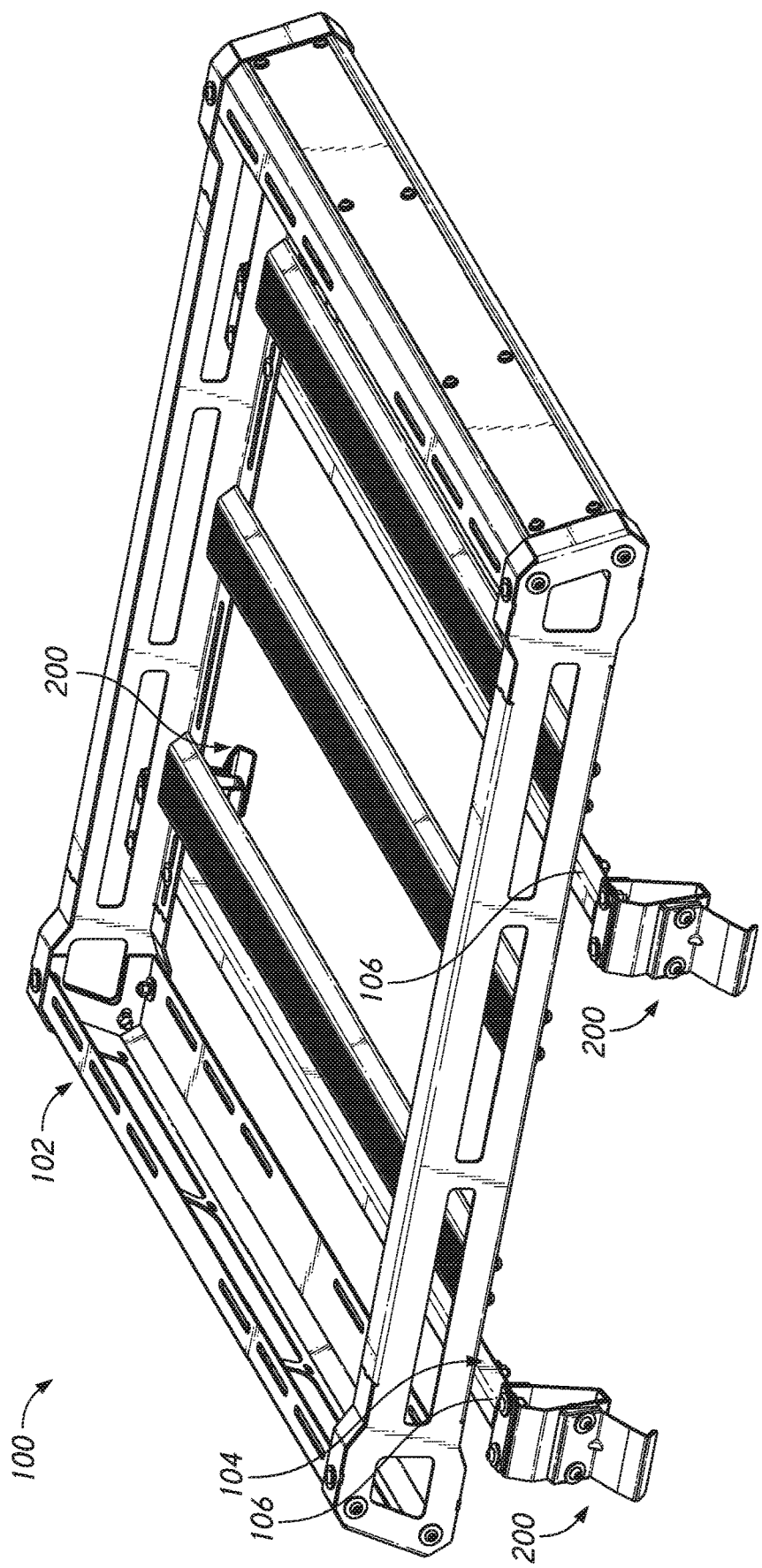
Figure 3:
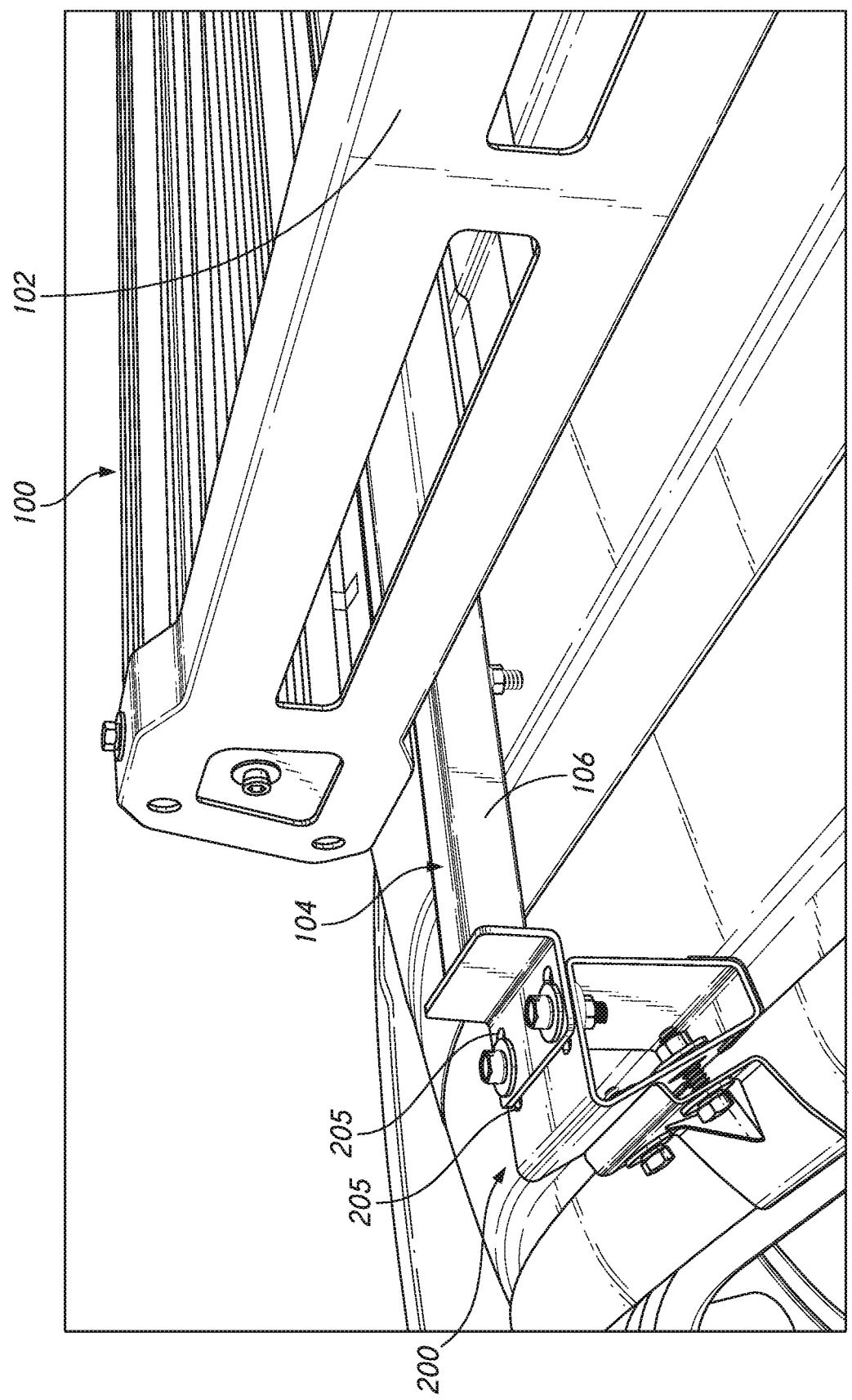
FIG. 3 illustrates an embodiment of a universal mounting roof rack assembly attached to a vehicle.

FIGS. 1-3 illustrate embodiments of the universal roof rack or universal roof rack assembly 100. As shown, the roof rack can include a roof rack body 102. The roof rack body 102 can be similar to the body of standard roof racks and can include slots, stacking features, moveable components, etc.

The roof rack body 102 can be attached to an attachment section 104. The body 102 and the attachment section 104 can be permanently or removably attached to one another. The roof rack assembly 100 can include two attachment sections 104, one generally at the front of the body 102 and one generally at the back of the body 102. In some embodiments, the roof rack assembly 100 can include 1, 2, 3, 4, 5, or 6 attachment sections 104. In some embodiments, the roof rack assembly 100 can include greater than 1, 2, 3, 4, 5, or 6 attachment sections 104. In some embodiments, the roof rack assembly 100 can include less than 2, 3, 4, 5, or 6 attachment sections 104.

The body 102 may define a generally rectangular frame including one or more support beams defining surfaces upon which a payload such as suitcases may be supported. In the illustrated embodiment the rack forms a plurality of laterally extending spaced support surfaces which provide support for items within the frame, but desirably weigh less than a single support spanning the length and width of the frame. Each of the attachment sections 104 can include a cross-bar, such as a lateral bar 106, extending along a width of the body 102. In some embodiments, the lateral bars 106 are parallel with one another. In some embodiments, the lateral bars 106 are not parallel. In some embodiments, the lateral bar 106 may be shorter, equal to, or wider than a width of the body 102. As shown, the body 102 can be attached to a top surface of the lateral bar 106. The body 102 can be permanently or removably attached to the lateral bar 106. The lateral bar 106 can have a generally rectangular cross section, but other shapes can be used as well (e.g., square, triangular, trapezoidal) and the particular shape does not limit the disclosure.

At opposite ends of the lateral bar 106, the roof rack assembly 100 can include an attachment assembly 200. Thus, when two lateral bars 106 are used, four attachment assemblies 200 can be used. In some embodiments, the number of attachment assemblies 200 is double the number of lateral bars 106. In some embodiments, the attachment assemblies 200 are all generally the same. In some embodiments, some of the attachment assemblies 200 can be different, such as including new components or removing certain components. In some embodiments, attachment assemblies 200 on opposite sides of the lateral bar 106 are mirror images. An enlarged view of the attachment assembly 200 is shown in FIGS. 4-10.

In other embodiments, the attachment assemblies 200 are attached to or integrally formed with the body 102. As shown, the lateral ends of the lateral bar 106 can be attached to a cross-bar support, such as a connecting mount 202. The connecting mount 202 can be permanently or removably coupled to the end of the lateral bar 106. In some embodiments, the connecting mount 202 can be generally L-shaped, thus having a vertical section 204, a horizontal section 206, and a bend 208 between the two. Thus, the vertical section 204 can attach to the lateral bar 106. The vertical section 204 can extend upward or downward relative to the horizontal section 206 of the connecting mount 202. In some embodiments, the vertical section 204 can contact a lateral surface of the gutter insert 210. The lateral bar 106 can attach to the vertical section 204 such that a top surface of the lateral bar 106 is disposed above the gutter insert 210 (e.g., as shown in FIG. 3), coplanar with a top portion 212 of the gutter insert 210 (e.g., as shown in FIG. 4), and/or below the top portion 212 of the gutter insert 210.

In some embodiments, the connecting mount 202 may not be used, and all the following components can be directly attached to the lateral bar 106, such as on a bottom surface of the lateral bar 106.

A gutter insert 210 can be attached to a bottom side of the horizontal section 206. For example, the gutter insert 210 can be attached to the horizontal section 206 through fasteners such as screws, bolts, adhesives, solder, etc. In some embodiments, two bolts can be used. As shown in FIGS. 9 and 10, both the gutter insert 210 and the horizontal section 206 of the connecting mount 202 may include slots 205, such as tracks, for fasteners to insert into. Thus, the fastener position can be adjusted within the slots 205 in order to adjust the position of the gutter insert 210 with respect to the lateral bar 106. In some embodiments, the slots 205 can extend in different dimensions, such as vertically and/or horizontally, allowing further adjustability. This can advantageously allow for adjustability of a height of the roof rack assembly 100 (e.g., a distance between the door clip 230 and the roof rack body 102) and/or adjustability of a width of the roof rack assembly 100 (e.g., a distance between lateral sides of the roof rack assembly 100).

Figure 4:
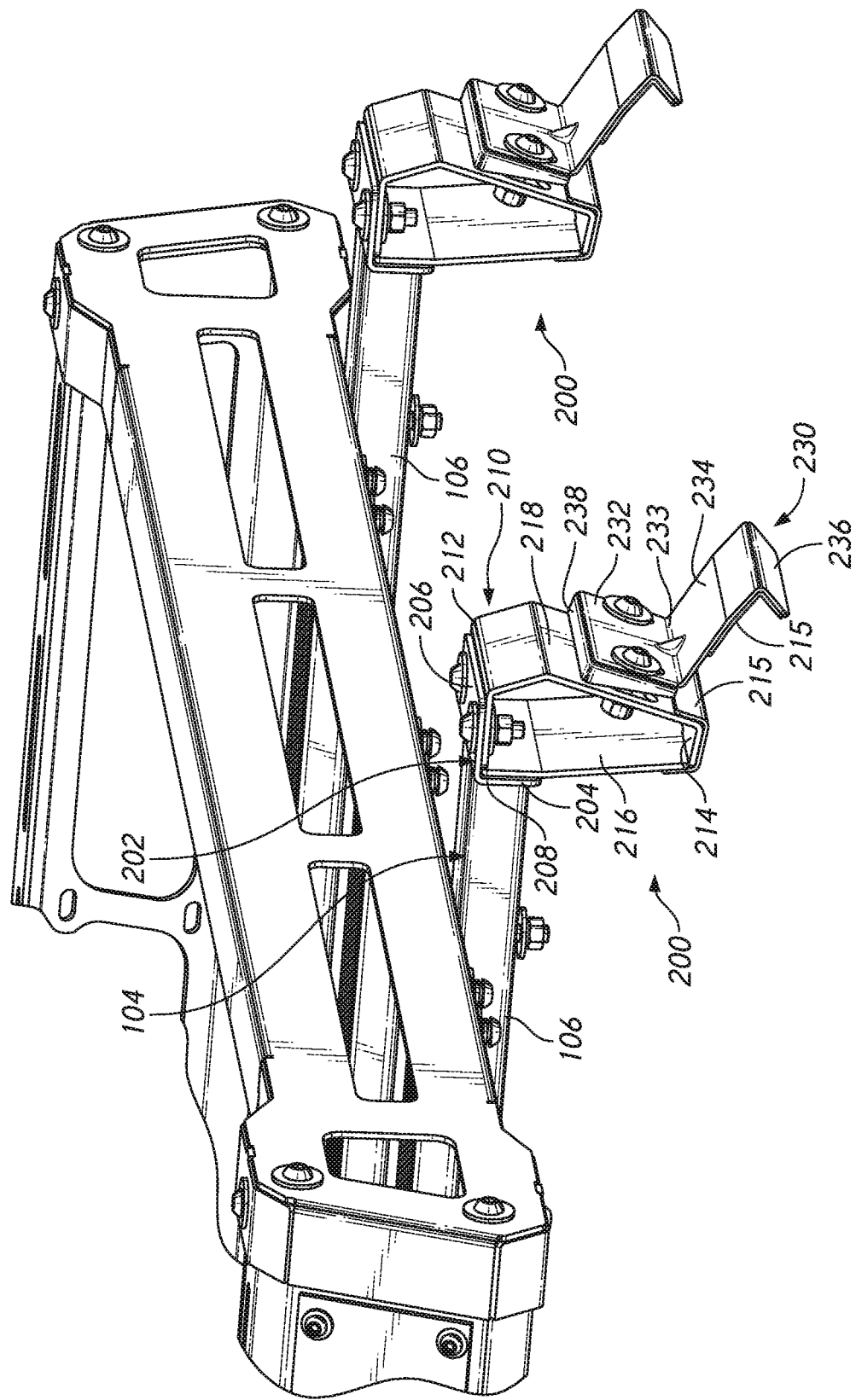
FIGS. 4 and 5 illustrate detailed views of the universal mounting roof rack assembly of FIG. 2.
Figure 5:
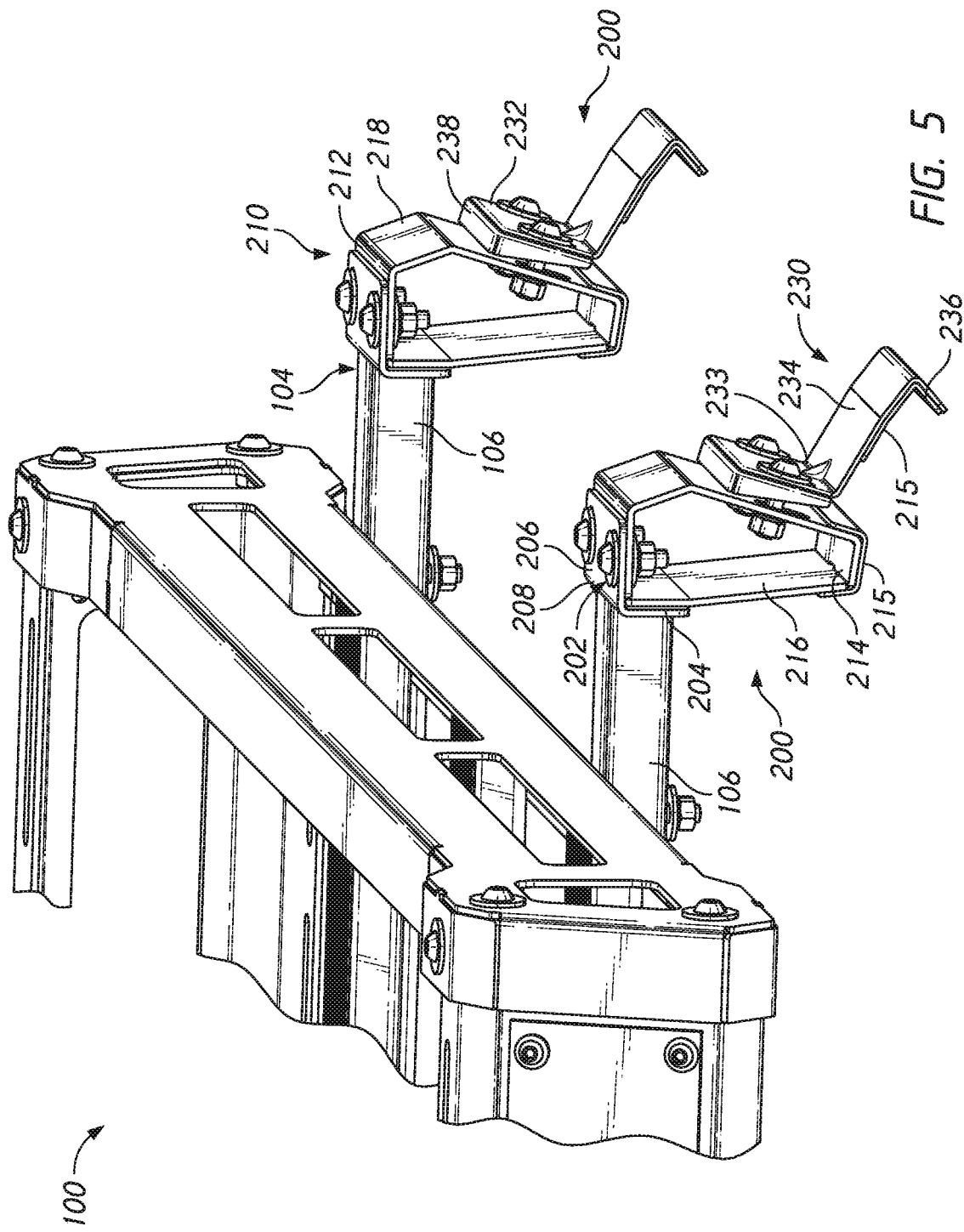
Figure 6:
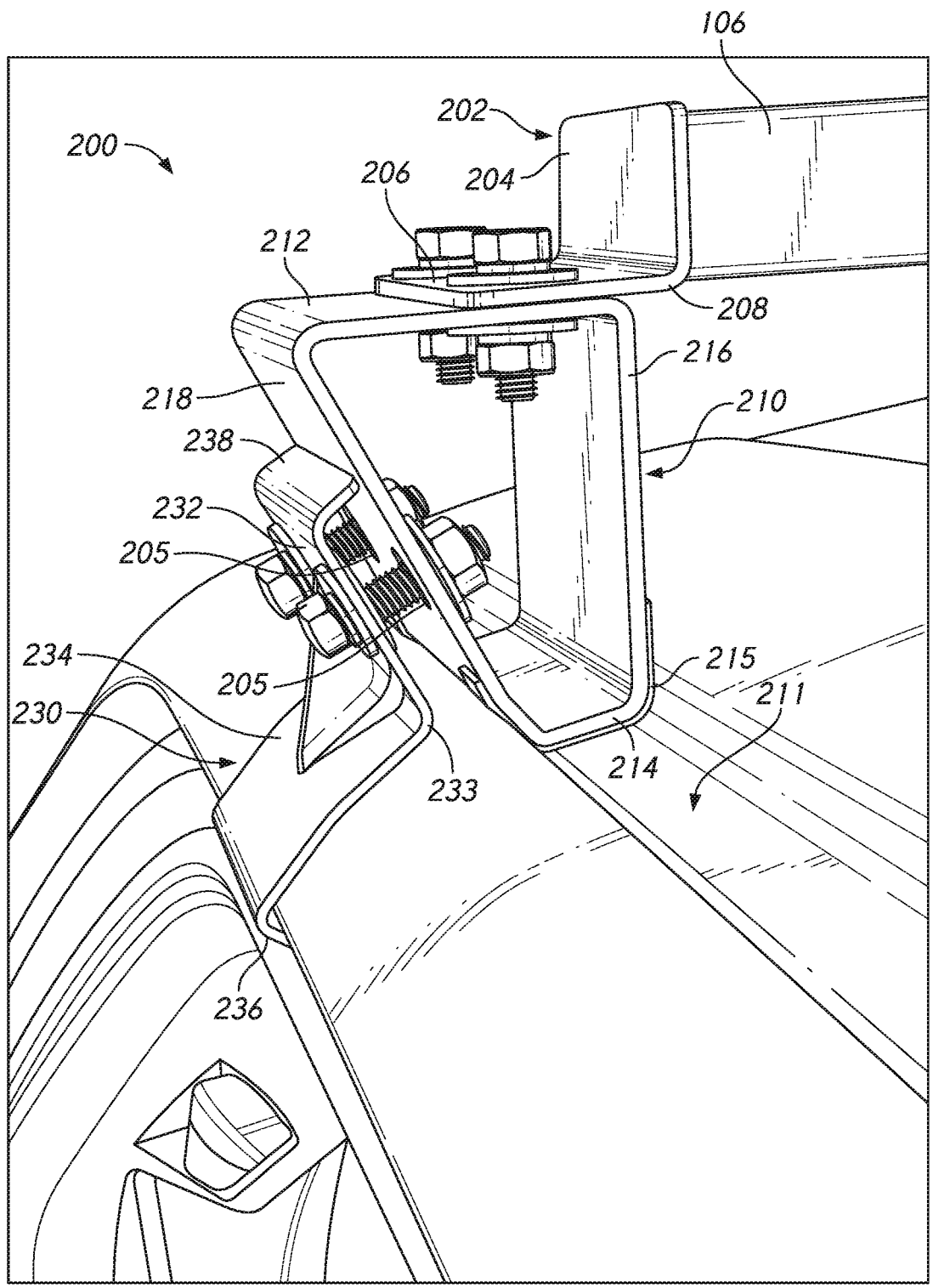
FIGS. 6 and 7 illustrate embodiments of a universal mounting roof rack assembly attached to a vehicle.
Figure 7:
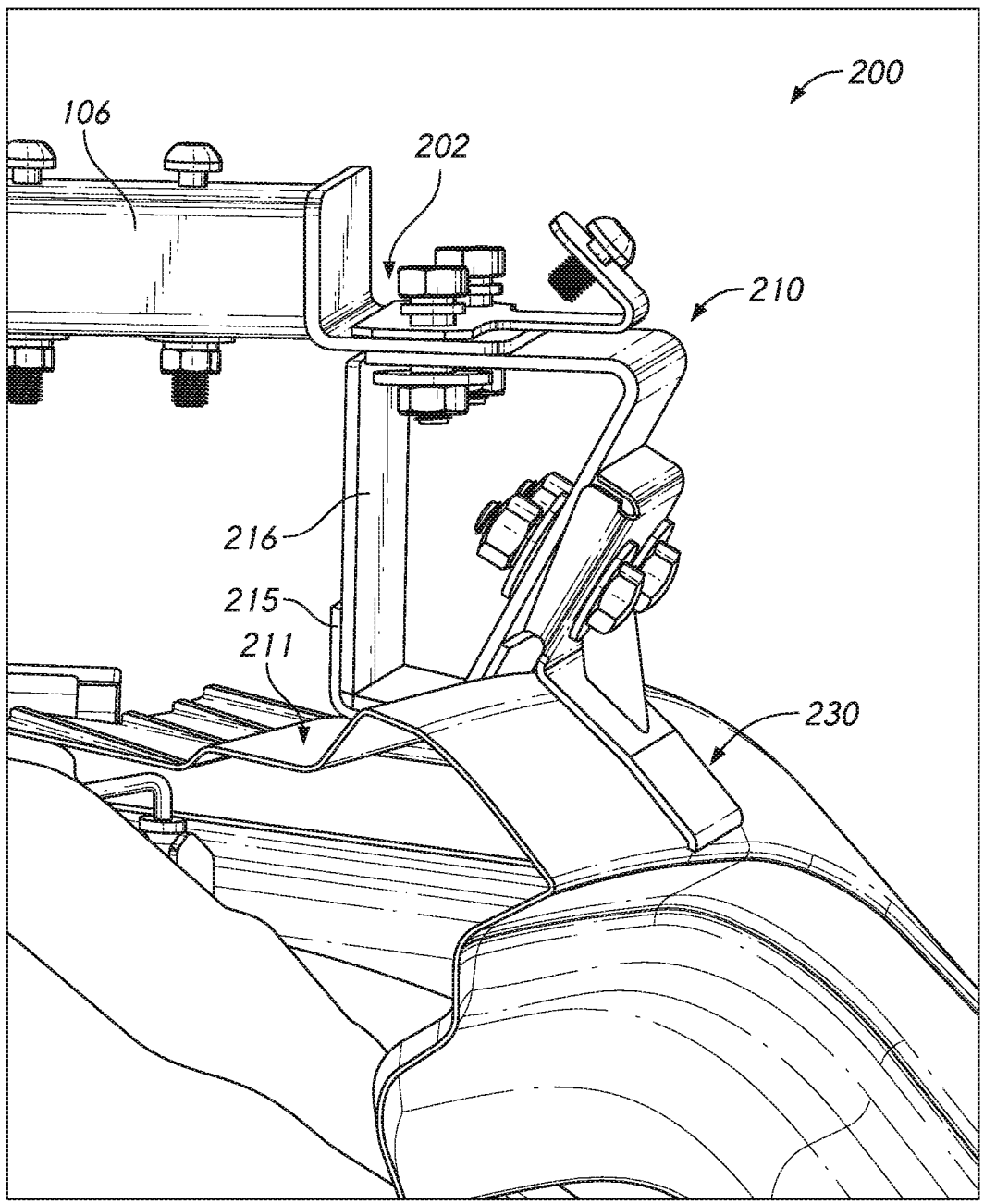
Figure 8B:
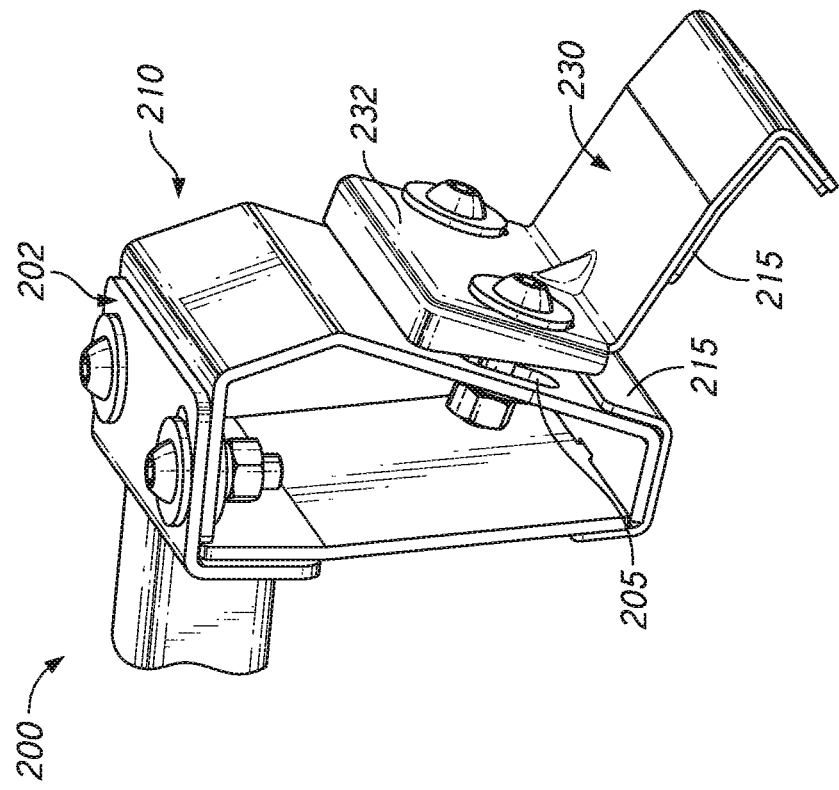
FIGS. 8A and 8B illustrate detailed views of an embodiment of an attachment assembly.
Figure 8A:
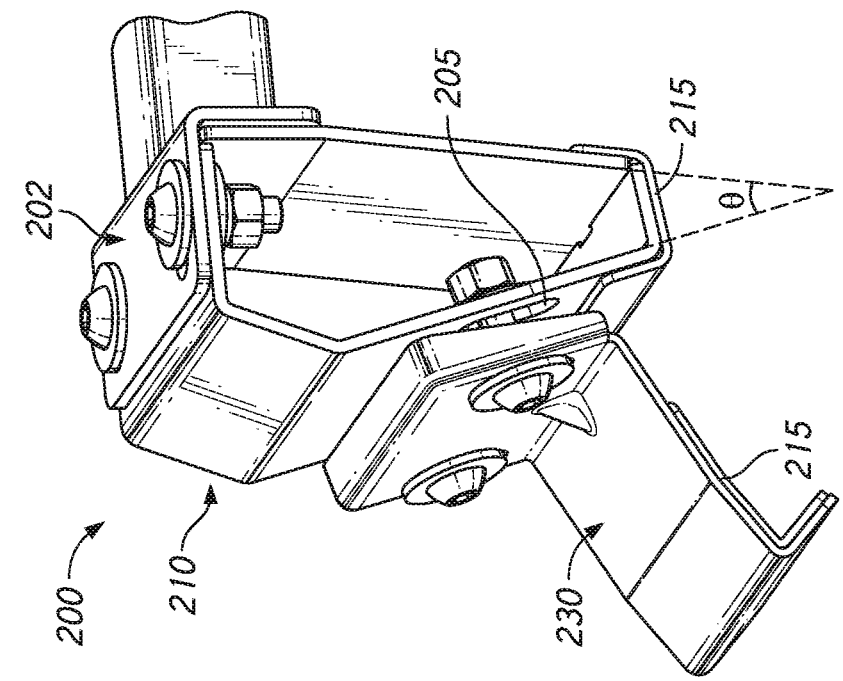

As shown in FIGS. 4-6, the gutter insert 210 can include a top portion 212, a base or connector, such as a bottom portion 214, a support strut, such as an inner connecting surface 216, and a clamp mount, such as an outer connecting surface 218. The outer connecting surface 218 can include a connecting flange. The bottom portion 214 can be configured to fit within a gutter (rain gutter, duct, rain duct) 211 of a vehicle. In some embodiments, the bottom portion 214 can be frictionally held within a gutter. In some embodiments, the top portion 212 can have the same dimensions as the bottom portion 214, thus forming a generally rectangular gutter insert 210. In some embodiments, the top portion 212 can be longer than the bottom portion 214, thereby forming a generally trapezoidal shape as shown in FIG. 6. In some embodiments, the top portion 212 can have a width (e.g., measured between the passenger side and the driver side of a vehicle) of 1.5, 2, or 2.5 times a width of the bottom portion 214. In some embodiments, the top portion 212 can have a width of greater than 1.5, 2, or 2.5 times a width of the bottom portion 214. In some embodiments, the top portion 212 can have a width of less than 1.5, 2, or 2.5 times a width of the bottom portion 214. The dimensions of the inner connecting surface 216 and the outer connecting surface 218 can vary depending on the dimensions of the top/bottom surfaces 212/214.

In some embodiments, the attachment assembly 200 can further comprise at least one resilient layer, such as a cushion 215. As illustrated in FIGS. 4, 5, 8A, 8B, 9, and 10, cushions 215 can be attached to the portions of the attachment assembly 200 that contact the vehicle. For example, cushions 215 can be attached to the door clip 230 and/or to the bottom portion 214 of the gutter insert 210. The cushions 215 can be separate components or integrally formed with the door clip 230 and/or gutter insert 210. The cushions 215 can be made of a soft or otherwise non-abrasive material. This can advantageously prevent the attachment assembly 200 from scratching or otherwise damaging the finish of the vehicle to which it is attached. The cushions 215 can also create a tighter fit between the attachment assembly 200 and the vehicle. This can reduce movement or noise generated by the roof rack assembly 100 while the vehicle is moving.

In some embodiments, an angle θ (FIG. 8A) between the inner connecting surface 216 and the outer connecting surface 218 can form an acute angle. In some embodiments, the angle θ between the inner connecting surface 216 and the outer connecting surface 218 can be about 10, 15, 20, 25, 30, 35, 40, or 45°. In some embodiments, the angle θ between the inner connecting surface 216 and the outer connecting surface 218 can be greater than about 10, 15, 20, 25, 30, 35, 40, or 45°. In some embodiments, the angle θ between the inner connecting surface 216 and the outer connecting surface 218 can be less than about 10, 15, 20, 25, 30, 35, 40, or 45°. Further, as discussed above, the bottom portion 214 can space the inner connecting surface 216 from the outer connecting surface 218. Desirably, in some embodiments, the inner connecting surface 216 engages an inner surface portion of the roof gutter and the outer connecting surface 218 engages an outer surface portion of the gutter to at least partially secure the roof rack assembly 100 in place. Desirably, the bottom portion 214 defines an outer surface which engages the central portion of the gutter to provide support for the roof rack assembly 100.

In some embodiments, the gutter insert 210 is hollow between the surfaces. In some embodiments, the gutter insert 210 is not hollow. In some embodiments, the gutter insert 210 can have a length (e.g., measured the front of the vehicle to the back of the vehicle) that is the same as the length of the lateral bar 106. In some embodiments, the gutter insert 210 can have a length (e.g., measured the front of the vehicle to the back of the vehicle) that is greater than a length of the lateral bar 106. In some embodiments, the gutter insert 210 can have a length (e.g., measured the front of the vehicle to the back of the vehicle) that is less than a length of the lateral bar 106.

The attachment assembly 200 can further comprise a clamp, such as a door clip 230 as illustrated or other retaining mechanisms such as a flange or hook. In some embodiments, the clamp can attach to a ledge, ridge, or other structural feature having sufficient strength and durability to support a portion of the roof rack assembly 100. For example, some vehicles may have a roof overhang that the clamp can at least partially wrap around. In some embodiments, the clamp is configured to at least partially extend into and/or at least partially wrap around a frame of the vehicle, such as a door frame. In some embodiments, including the illustrated embodiment, the door clip 230 can include a gutter attachment surface 232, a vehicle attachment surface 234, and a flange (hook, clip) 236. The door clip 230 can comprise multiple components. The gutter attachment surface 232 and the vehicle attachment surface 234 can be adjoined at a bend 233. Thus, the flange 236 can be spaced away from the gutter attachment surface 232 by the vehicle attachment surface 234. In some embodiments, the door flange 230 can be adjustably connected to the gutter insert 210. Thus, the door flange 230 can be adjusted towards or away from the gutter insert 210 in order to accommodate different sized vehicles. The vehicle attachment surface 234 can be contoured in some embodiments to follow a portion of a vehicle. The flange 236 can be configured to at least partially wrap around a door frame to hold roof rack assembly 100 onto the vehicle to keep it in place. In some embodiments, the flange 236 does not affect the opening or closing of the doors of the vehicle. In some embodiments, the flange 230 may have a length of less than, the same as, or greater than the length of the gutter insert 210.

The gutter attachment surface 232 can be attached to the gutter insert 210 through fasteners such as screws, bolts, adhesives, etc. In some embodiments, the gutter attachment surface 232 can be spaced away from the gutter insert 210 by extension 238. The gutter attachment surface 232 can be adjustably moved with respect to the gutter insert 210, thus allowing for the roof rack assembly 100 to be used on different sized vehicles and to provide a tight fit on the vehicle. For example, as illustrated in FIGS. 9 and 10, the gutter attachment surface 232 and an outer connecting surface 218 of the gutter insert 210 can include slots 205, such as tracks, for fasteners to insert into. Thus, the fastener position can be adjusted within the slots 205 in order to adjust the position of the door clip 230 relative to the lateral bar 106 and/or the gutter insert 210. In some embodiments, the slots 205 can extend in different dimensions, such as vertically and/or horizontally, allowing further adjustability. For example, the slots 205 can extend vertically to advantageously allow the door clip 230 to move upwards and downwards relative to the lateral bar 106 and/or the gutter insert 210, thereby accommodating various types of vehicles with different gutters 211.

In some embodiments, the gutter insert 210 can change size/shape/dimension so that it can fit within different sizes of gutters. For example, the bottom portion 214 may be expandable or retractable in order to fit different sizes of gutters. Further, the inner connecting surface 216 and an outer connecting surface 218 can have variable heights so as to change a height of the body 102. In some embodiments, the dimensions can be changed while the roof rack assembly 100 is attached to a vehicle.

Thus, the roof rack assembly 100 can include a mounting assembly 200 (for example, an attachment assembly 200 can be disposed on each of the four corners of the roof rack) that can be sized to fit within rain gutters/ducts of a vehicle. This can allow the universal mounting roof rack assembly 100 to properly align on the vehicle.

Accordingly, a user would not have to drill, or otherwise permanently damage, the roof of the vehicle to install the roof rack assembly 100. Moreover, the universal roof rack assembly 100 can facilitate easy adjustment of the roof rack assembly 100 on a vehicle without damaging the roof, thus allowing for optimizing the position of the roof rack assembly 100 for different situations.

From the foregoing description, it will be appreciated that inventive roof rack assemblies are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A universal roof rack assembly for a vehicle having a roof with a rain gutter defining a first inner surface, a second inner surface opposite and facing the first inner surface, and a lower surface extending between the first and second inner surfaces, the universal roof rack assembly comprising:
   a roof rack body;
   a plurality of attachment assemblies, each of the plurality of attachment assemblies attached to the roof rack body or a brace supporting the roof rack body, each of the plurality of attachment assemblies comprising:
      a gutter insert configured to extend within the rain gutter of the vehicle, the gutter insert having a support strut defining a first portion defining a first outer surface configured to face inboards of the vehicle and contact the first inner surface of the rain gutter, a clamp mount defining a second portion defining a second outer surface configured to face outboards of the vehicle and contact the second inner surface of the rain gutter, and a base defining a bottom portion extending between the first portion and the second portion and defining a bottom surface configured to face the roof of the vehicle and contact the lower surface of the rain gutter, wherein the first and second outer surfaces of the gutter insert are disposed on opposite sides of a vertical plane extending along a longitudinal axis of the bottom portion of the gutter insert, wherein the first outer surface and the second outer surface form an acute angle, and wherein the first portion and the second portion are separated by an open space; and
      a clamp attached to the gutter insert, the clamp configured to at least partially extend into and at least partially wrap around a frame of the vehicle, wherein the clamp comprises a vehicle attachment surface configured to engage a portion of the roof of the vehicle extending away from the second portion of the gutter insert and to at least partially wrap around the frame of the vehicle that is outboard of the rain gutter;
   wherein the universal roof rack assembly is configured to attach to the vehicle without drilling.

2. The universal roof rack assembly of claim 1, wherein the frame of the vehicle is a door frame.

3. The universal roof rack assembly of claim 1, wherein the attachment assembly extends in an opposite direction from a pair of laterally extending bars from the roof rack body.

4. The universal roof rack assembly of claim 1, wherein dimensions of the gutter insert are configured to be modified by a user.

5. The universal roof rack assembly of claim 1, wherein the gutter insert is positioned between the roof rack body and the clamp.

6. The universal roof rack assembly of claim 1, wherein the first outer surface and the second outer surface of the gutter insert form an angle between 10-45°.

7. The universal roof rack assembly of claim 1, wherein the bottom portion spaces the first portion from the second portion.

8. The universal roof rack assembly of claim 1, wherein the clamp is adjustably connected to the gutter insert.

9. The universal roof rack assembly of claim 8, wherein each of the clamp and the gutter insert defines a track configured to receive a fastener, the track of the clamp configured to align with the track of the gutter insert such that a relative position of the clamp and the gutter insert is adjustable.

10. The universal roof rack assembly of claim 1, wherein each of the plurality of attachment assemblies comprises a cushion connected to a portion of the attachment assembly that is configured to contact the vehicle.

11. The universal roof rack assembly of claim 1, wherein the roof rack assembly defines a height and a width, at least one of the height and the width of the roof rack assembly being adjustable.

12. The universal roof rack assembly of claim 11, wherein both the height and the width of the roof rack assembly are adjustable.

13. A vehicle having the universal roof rack assembly of claim 1 attached.

14. A vehicle comprising:
a roof having a rain gutter defined by:
a first section defining a first surface;
a second section defining a second surface generally opposite the first surface; and
a third section connecting the first surface and the second surface; and
a universal roof rack assembly for a vehicle, the universal roof rack assembly comprising:
a roof rack body;
a plurality of attachment assemblies, each of the plurality of attachment assemblies attached to the roof rack body or a brace supporting the roof rack body, each of the plurality of attachment assemblies comprising:
a gutter insert facing within the rain gutter, the gutter insert having a first portion defining a first surface extending inboards of the vehicle and a second portion defining a second surface facing outboards of the vehicle, wherein the first surface and the second surface form an acute angle and wherein the first portion and the second portion are separated by an open space; and
a clamp attached to the gutter insert, the clamp at least partially extending into and at least partially wrapping around a frame of the vehicle that is laterally spaced apart from the rain gutter;
wherein the universal roof rack assembly is attached to the vehicle without drilling; and
wherein the first surface of the gutter insert contacts the first surface of the rain gutter and the second surface of the gutter insert contacts the second surface of the rain gutter, wherein the gutter insert is received into and mates with the rain gutter.

15. The vehicle of claim 14, wherein the frame of the vehicle is a door frame.

16. The vehicle of claim 14, wherein dimensions of the gutter insert are configured to be modified by a user.

17. The vehicle of claim 14, wherein the first surface and the second surface of the gutter insert form an angle between 10-45°.

18. The vehicle of claim 14, wherein the gutter insert further comprises a third portion spacing the first portion from the second portion.

19. The vehicle of claim 14, wherein the clamp is adjustably connected to the gutter insert.

20. The vehicle of claim 19, wherein each of the clamp and the gutter insert defines a track configured to receive a fastener, the track of the clamp configured to align with the track of the gutter insert such that a relative position of the clamp and the gutter insert is adjustable.

21. The vehicle of claim 14, wherein each of the plurality of attachment assemblies comprises a cushion connected to a portion of the attachment assembly that contacts the vehicle.

22. The vehicle of claim 14, wherein the clamp comprises a vehicle attachment surface that engages a portion of the roof of the vehicle extending away from the second portion of the gutter insert and at least partially wraps around the frame of the vehicle that is laterally spaced apart from the rain gutter.

* * * * *